UNITED STATES PATENT OFFICE.

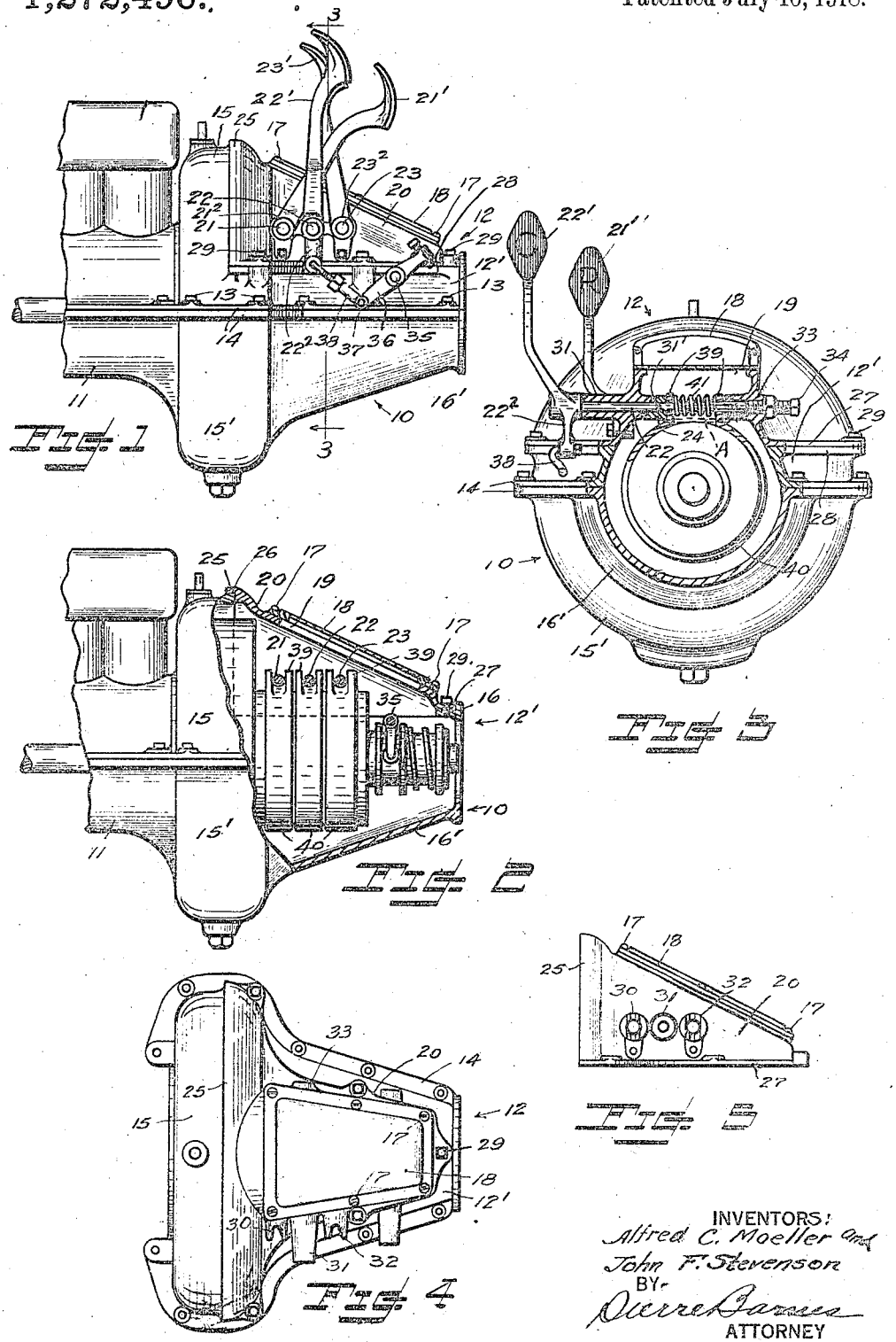

ALFRED C. MOELLER AND JOHN F. STEVENSON, OF SEATTLE, WASHINGTON.

TRANSMISSION-GEAR CASING.

1,272,496.   Specification of Letters Patent.   Patented July 16, 1918.

Application filed December 20, 1917. Serial No. 208,009.

*To all whom it may concern:*

Be it known that we, ALFRED C. MOELLER and JOHN F. STEVENSON, citizens of the United States, residing at Seattle, in the county of King and State of Washington, have invented certain new and useful Improvements in Transmission-Gear Casings, of which the following is a specification.

This invention relates to transmission gear casings of automobiles of the Ford type.

The object of our invention is to provide for casings of this character a cover section which is more readily detachable than the casing cover heretofore used to afford easier accessibility to the interior of the casing for the purpose of inspecting the mechanism contained therein, or for adjusting and replacing parts of the same.

The invention consists in the novel improved construction of a transmission gear casing, as will be hereinafter described and claimed.

Referring to the accompanying drawings—

Figure 1 is a side elevational view of automobile engine devices embodying our improvements. Fig. 2 is a similar view with parts broken away and shown partly in vertical longitudinal section. Fig. 3 is a transverse vertical section through 3—3 of Fig. 1. Fig. 4 is a plan view of upper or removable sections of the gear casing. Fig. 5 is a side elevational view of the cover or separable part shown detached.

Transmission gear casings of the Ford type as heretofore made, comprise a lower section 10, formed integral with the engine crank casing 11, and an upper section 12 which is secured to said lower section by bolts 13 engaging the flange elements 14 of both sections. Said upper and lower sections are formed to provide, adjacent to the engine, a substantially cylindrical portion 15—$15^1$ and to the rear of the latter a tapering or conical portion, as indicated by 16—$16^1$ in Fig. 2.

Detachably connected by screws 17 to the top of the tapering portion 16 of the section 12 is a plate 18 which serves as a cover for an aperture 19 therein.

According to the present invention, the casing section 12 is formed with a separable part 20 to close the opening therein above a horizontal plane disposed at a distance below the pedal shafts 21, 22 and 23 and to the rear of a vertical plane extending transversely through the cylindrical portion 15 of the upper section 12.

The casing part 20, hereinafter designated as the cover, is formed to fit the part $12^1$ by the provision at its forward edge, of an offset rim portion 25 to overlie a seat 26 provided on the cylindrical portion 15 and by means of a flange 27 at its lower edge which seats upon a flange 28 of the part $12^1$. The cover 20 is detachably held in place, as by cap screws 29 extending through the flange 27 into threaded holes in the flange 28.

Bored bosses are provided on one side of the cover to serve as bearings for the aforesaid pedal shafts, one of said bosses 31 being formed with a cam extremity $31^1$ within the casing to coact with a cam device 24 provided on the shaft 22 to effect axial movements to the shaft when the same is turned by the associated pedal $22^1$.

For the other pedal shafts 21 and 23 axial movements are afforded by means of cam members 30 and 32 secured to the casing and coöperating with cam elements (not shown) formed on the opposing faces of the hubs $21^2$ and $23^2$ of the respective pedals $21^1$ and $23^1$.

The cover 20 is also provided with an internally threaded boss 33 to accommodate the usual "slow speed" adjusting screw 34 for regulating the action of the shaft 22. The clutch lever shaft 35 is journaled in bearing boxes provided in the casing part $12^1$. The lever 36 for the shaft 35 is connected by a pin 37 with a clevis rod 38 which, in turn, is connected to an arm $22^2$ extending downwardly from the hub of pedal $22^1$.

The pedal shafts 21, 22 and 23 extend through notches in the bifurcated ears 39 of the bands 40 for the reverse, slow speed and brake connections. Springs, such as 41, are provided on the respective pedal shafts between the opposing ears of the various aforesaid bands 40.

From the foregoing, it is seen that the several pedals and the shafts 21, 22 and 23 therefor are removable with the cover. Before doing so, however, and to facilitate the return of such shafts and the springs 41 into the openings in the respective bands, the latter should be secured against springing open as by tying coupling strings or an equivalent about the pairs of ears of each of the bands 40 below the shafts, as indicated by dotted lines A in Fig. 3 with respect to the shaft 22.

The referred-to coupling devices are applied through the opening 19 after the plate 18 is temporarily removed. The cover 20 is then disconnected by withdrawing cap screws 29 and the shackle-rod 38 is disconnected by removing pin 37, whereupon the cover 20 and the pedal shafts may be taken off together and be placed out of the way of the operator to enable him to inspect, adjust or repair any of the parts of the controlling or operating mechanism remaining in the casing.

To replace the cover and attachments, the above operations are reversed and both the removal and replacing of the cover and the attachments thereof may be easily and conveniently performed by one man with little loss of time, instead of requiring the services of two men for a long time, as hitherto required when it has been necessary to remove the entire upper section 12 when access is to be had to any of the parts within the casing.

The invention is particularly valuable to owners of automobiles who attend to the repair and upkeep of their cars.

What we claim, is—

1. A transmission gear casing comprising two separable members, one superposed on the other, means to secure said members together, the upper of said members being formed with an inlet opening in its top, a detachable apertured cover for said opening, said cover having bearings for transversely arranged pedal shafts, said upper of said casing members having bearings for a transversely arranged clutch-lever shaft, releasable means for operatively connecting one of said pedal shafts with the clutch-lever shaft, and a plate removably secured to said cover for closing the aperture thereof.

2. A transmission gear casing formed with a cylindrical front portion and a conical rear portion having an opening extending through both said portions of the casing, a cover for said opening, means to detachably secure said cover to the casing, the walls of the cover and the subjacent part of the casing being provided with shaft bearings, and shafts journaled in said bearings, the shafts which are journaled in the cover being removable therewith without disturbing the shaft which is journaled in the transverse bearing of the casing part below said cover.

Signed at Seattle, Wash., this 10th day of December, 1917.

ALFRED C. MOELLER.
JOHN F. STEVENSON.

Witnesses:
PIERRE BARNES,
E. PETERSON.